United States Patent
Boraten et al.

(10) Patent No.: US 12,380,029 B2
(45) Date of Patent: Aug. 5, 2025

(54) CONDENSED COHERENCE DIRECTORY ENTRIES FOR PROCESSING-IN-MEMORY

(71) Applicant: Advanced Micro Devices, Inc., Santa Clara, CA (US)

(72) Inventors: Travis Henry Boraten, Austin, TX (US); Varun Agrawal, Westford, MA (US); Michael Warren Boyer, Redmond, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 46 days.

(21) Appl. No.: 18/146,904

(22) Filed: Dec. 27, 2022

(65) Prior Publication Data

US 2024/0211402 A1    Jun. 27, 2024

(51) Int. Cl.
*G06F 12/0817*    (2016.01)
*G06F 12/0815*    (2016.01)

(52) U.S. Cl.
CPC .. *G06F 12/0817* (2013.01); *G06F 2212/1016* (2013.01)

(58) Field of Classification Search
CPC ............... G06F 12/0815; G06F 12/082; G06F 12/0817; G06F 12/0828; G06F 12/0891; G06F 2212/283; G06F 2212/1016
USPC ........................................................ 711/141
See application file for complete search history.

(56) References Cited

U.S. PATENT DOCUMENTS

| | | | |
|---|---|---|---|
| 11,625,251 B1 | 4/2023 | Agrawal et al. | |
| 12,008,378 B2 | 6/2024 | Agrawal et al. | |
| 2008/0244190 A1* | 10/2008 | Shedivy | G06F 12/0817 711/141 |
| 2009/0193192 A1* | 7/2009 | Burckhardt | G06F 12/0831 711/124 |
| 2011/0296115 A1 | 12/2011 | Speight et al. | |
| 2017/0262369 A1* | 9/2017 | Murphy | G06F 12/084 |
| 2018/0165199 A1 | 6/2018 | Brandt et al. | |
| 2018/0285264 A1* | 10/2018 | Kayiran | G06F 12/0806 |
| 2018/0336035 A1* | 11/2018 | Choi | G06F 9/35 |
| 2019/0043558 A1 | 2/2019 | Suh et al. | |
| 2021/0149819 A1* | 5/2021 | Kotra | G06F 12/1027 |
| 2022/0188233 A1 | 6/2022 | Kalamatianos et al. | |
| 2023/0244496 A1 | 8/2023 | Agrawal et al. | |

(Continued)

OTHER PUBLICATIONS

Agrawal, Varun , et al., "US Application as Filed", U.S. Appl. No. 17/561,112, filed Dec. 23, 2021, 25 pages.

(Continued)

*Primary Examiner* — Hashem Farrokh
(74) *Attorney, Agent, or Firm* — FIG. 1 Patents (57) ABSTRACT

In accordance with the described techniques for condensed coherence directory entries for processing in memory, a computing device includes a core that includes a cache, a memory that includes multiple banks, a coherence directory that includes a condensed entry indicating that data associated with a memory address and the multiple banks is not stored in the cache, and a cache coherence controller. The cache coherence controller receives a processing-in-memory command to the memory address and performs a single lookup in the coherence directory for the processing-in-memory command based on inclusion of the condensed entry in the coherence directory.

20 Claims, 5 Drawing Sheets

(56) References Cited

U.S. PATENT DOCUMENTS

2023/0325317 A1   10/2023   Boyer et al.
2024/0330186 A1   10/2024   Boraten et al.

OTHER PUBLICATIONS

Boyer, Michael Warren, et al., "US Application as Filed", U.S. Appl. No. 17/719,225, filed Apr. 12, 2022, 32 pages.
Cantin, J.F., et al., "Coarse-Grain Coherence Tracking: RegionScout and Region Coherence Arrays", IEEE Micro, vol. 26, No. 1 [retrieved Oct. 16, 2022]. Retrieved from the Internet <https://pharm.ece.wisc.edu/papers/ieeemicro2005.pdf>., Oct. 11, 2022, 10 Pages.
Boraten, Travis Henry, et al., "US Application as Filed", U.S. Appl. No. 18/192,925, filed Mar. 30, 2023, 48 pages.
U.S. Appl. No. 18/132,879, "Notice of Allowance", U.S. Appl. No. 18/132,879, filed Feb. 6, 2024, 7 pages.
U.S. Appl. No. 17/719,225, "Non-Final Office Action", U.S. Appl. No. 17/719,225, filed Sep. 14, 2023, 9 pages.
U.S. Appl. No. 17/719,225, "Final Office Action", U.S. Appl. No. 17/719,225, filed May 9, 2024, 13 pages.
U.S. Appl. No. 17/719,225, "Non-Final Office Action", U.S. Appl. No. 17/719,225, filed Sep. 16, 2024, 11 pages.

\* cited by examiner

CONDENSED COHERENCE DIRECTORY ENTRIES FOR PROCESSING-IN-MEMORY

BACKGROUND

Processing-in-memory (PIM) architectures move processing of memory-intensive computations to memory. This contrasts with standard computer architectures which communicate data back and forth between a memory and a remote processing unit. In terms of data communication pathways, remote processing units of conventional computer architectures are further away from memory than PIM components. As a result, these conventional computer architectures suffer from increased data transfer latency, which can decrease overall computer performance. Further, due to the proximity to memory, PIM architectures can also provision higher memory bandwidth and reduced memory access energy relative to conventional computer architectures particularly when the volume of data transferred between the memory and the remote processing unit is large. Thus, PIM architectures enable increased computer performance while reducing data transfer latency as compared to conventional computer architectures that implement remote processing hardware.

DETAILED DESCRIPTION

Overview

A memory architecture includes a processing unit communicatively coupled to a memory module that includes a memory and a processing-in-memory (PIM) component. The processing unit includes a core, which maintains a cache where data of the memory is stored. In one or more implementations, the cache and the memory store different versions of a particular item of data. As part of processing a command to a particular memory address, for instance, the core retrieves the data of the particular memory address and stores the data in the cache. Subsequently, the core modifies the data in the cache, leaving the version of the data that is stored in the memory stale. Thus, the processing unit additionally includes a cache coherence controller employed to enforce cache coherence, or in other words, uniformity of data that is shared among multiple memory resources, e.g., the cache and the memory. To do so, the cache coherence controller maintains a coherence directory, which includes entries indicating portions of the memory that have data stored in the cache. In response to receiving a command for a particular memory address, the cache coherence controller performs a lookup in the coherence directory for the particular memory address. If the lookup is a miss, the command is forwarded to a memory controller to access the data from the memory. If the lookup is a hit, the cache coherence controller checks whether the data corresponding to the memory address has been modified in the cache and if so, the cache coherence controller instructs the core to write the data back to memory, and optionally, invalidate the data in the cache.

The memory includes multiple banks with respect to which the PIM component performs various in-memory processing operations. In one or more implementations, the PIM component is configured to operate on each of the multiple banks in parallel to execute a single PIM command. Thus, a single PIM command of a conventionally configured system triggers many lookups in the coherence directory—one lookup for each one of the multiple banks that the PIM component operates on. Notably, the number of lookups triggered by PIM commands leads to increased lookup latency and often creates bottlenecks in the coherence directory, thereby decreasing overall computer performance.

To reduce the number of lookups triggered by PIM commands, condensed coherence directory entries are described. In accordance with the described techniques, the cache coherence controller receives an initial PIM command having a particular memory address. To service the initial PIM command, the cache coherence controller performs a series of initial coherence directory lookups for the memory address on each of the multiple banks that the PIM component operates on. Responsive to the initial lookups, the cache coherence controller creates a condensed entry that tracks whether a version of the data of the memory address, for each of the banks, is stored in the cache. Further, the cache coherence controller receives a subsequent PIM command having the particular memory address and performs a lookup in the coherence directory for the condensed entry. Since the condensed entry exists in the coherence directory, the lookup results in a hit.

In one or more implementations, inclusion of the condensed entry in the coherence directory indicates that the cache does not store a corresponding version of the data of the memory address. In these implementations, the cache coherence controller forwards the subsequent PIM command to the memory controller to access the data from the memory without performing any additional coherence directory lookups on individual banks. In other words, the described techniques perform a single coherence directory lookup for the subsequent PIM command, whereas conventional techniques perform one lookup in the coherence directory for each bank that the PIM component operates on. Thus, the described techniques decrease lookup latency in the coherence directory and alleviate coherence directory bottlenecks by reducing the number of coherence directory lookups for PIM commands.

In some aspects, the techniques described herein relate to a computing device comprising a core that includes a cache, a memory that includes multiple banks, a coherence directory that includes a condensed entry indicating that data associated with a memory address and the multiple banks is not stored in the cache, and a cache coherence controller configured to receive a processing-in-memory command to the memory address, and perform a lookup in the coherence directory for the processing-in-memory command based on inclusion of the condensed entry in the coherence directory.

In some aspects, the techniques described herein relate to a computing device, wherein the cache coherence controller performs a single lookup in the coherence directory for the processing-in-memory command.

In some aspects, the techniques described herein relate to a computing device, wherein the cache coherence controller is further configured to receive an initial processing-in-memory command to the memory address, perform, for the initial processing-in-memory command, initial lookups in the coherence directory on each of the multiple banks, and create the condensed entry responsive to the initial lookups.

In some aspects, the techniques described herein relate to a computing device, wherein a non-processing-in-memory command causes the data associated with the memory address and an individual bank of the multiple banks to be stored in the cache.

In some aspects, the techniques described herein relate to a computing device, wherein the cache coherence controller is further configured to invalidate the condensed entry responsive to the non-processing-in-memory command being received.

In some aspects, the techniques described herein relate to a computing device, wherein the coherence directory includes an indication of a range of memory addresses that relate to processing-in-memory workloads.

In some aspects, the techniques described herein relate to a computing device, wherein the cache coherence controller is further configured to receive a non-processing-in-memory command to an individual bank and a particular memory address, perform an additional lookup in the coherence directory for the individual bank and the particular memory address, the additional lookup missing in the coherence directory, and perform, based on the particular memory address being included in the range of memory addresses, a further lookup in the coherence directory for an additional condensed entry having the particular memory address.

In some aspects, the techniques described herein relate to a computing device, wherein the cache coherence controller is further configured to bypass, based on the particular memory address not being included in the range of memory addresses, the further lookup.

In some aspects, the techniques described herein relate to a method comprising receiving a first processing-in-memory command to a memory address, performing, for the first processing-in-memory command, lookups in a coherence directory on multiple banks of a memory, creating a condensed entry in the coherence directory for the memory address responsive to the lookups, the condensed entry including multiple cache statuses each indicating whether data associated with the memory address and an individual bank of the multiple banks is stored in a cache of a core, receiving a second processing-in-memory command to the memory address, and performing a lookup in the coherence directory for the second processing-in-memory command based on each of the multiple cache statuses indicating that the data is not stored in the cache.

In some aspects, the techniques described herein relate to a method, wherein performing the lookup includes performing a single lookup in the coherence directory for the second processing-in-memory command.

In some aspects, the techniques described herein relate to a method, wherein a non-processing-in-memory command causes the data associated with the memory address and a respective individual bank of the multiple banks to be stored in the cache.

In some aspects, the techniques described herein relate to a method, further comprising modifying a respective cache status of the condensed entry to indicate that the data of the respective individual bank is stored in the cache responsive to receiving the non-processing-in-memory command.

In some aspects, the techniques described herein relate to a method, further comprising receiving a third processing-in-memory command to the memory address, performing, for the third processing-in-memory command, an additional lookup for the condensed entry in the coherence directory, the condensed entry including the respective cache status, and performing a further lookup in the coherence directory for the third processing-in-memory command, the further lookup performed on the respective individual bank.

In some aspects, the techniques described herein relate to a method, wherein the further lookup is a single lookup in the coherence directory.

In some aspects, the techniques described herein relate to an apparatus comprising a multi-core processor that includes multiple caches, a memory that includes multiple banks, a coherence directory that includes a condensed entry for a memory address, the condensed entry including multiple cache statuses each indicating whether data associated with the memory address and a sub-grouping of the multiple banks is stored in one of the multiple caches, and a cache coherence controller configured to receive a processing-in-memory command to the memory address, and perform a lookup in the coherence directory for the processing-in-memory command based on each of the multiple cache statuses indicating that the data is not stored in one of the multiple caches.

In some aspects, the techniques described herein relate to an apparatus, wherein the cache coherence controller performs a single lookup in the coherence directory for the processing-in-memory command.

In some aspects, the techniques described herein relate to an apparatus, wherein the cache coherence controller is further configured to receive an initial processing-in-memory command to the memory address, perform, for the initial processing-in-memory command, initial lookups in the coherence directory on each of the multiple banks, and create the condensed entry responsive to the initial lookups.

In some aspects, the techniques described herein relate to an apparatus, wherein a non-processing-in-memory command causes the data associated with the memory address and an individual bank of the multiple banks to be stored in at least one cache of the multiple caches.

In some aspects, the techniques described herein relate to an apparatus, wherein the cache coherence controller is further configured to modify a respective cache status of the condensed entry to indicate that the data of a corresponding sub-grouping of the multiple banks is stored in one of the multiple caches responsive to the non-processing-in-memory command being received.

In some aspects, the techniques described herein relate to an apparatus, wherein the cache coherence controller is further configured to receive an additional processing-in-memory command to the memory address, perform, for the additional processing-in-memory command, an additional lookup for the condensed entry in the coherence directory, the condensed entry including the respective cache status, and perform, for the additional processing-in-memory command, further lookups on individual banks of the corresponding sub-grouping.

Figure 1:
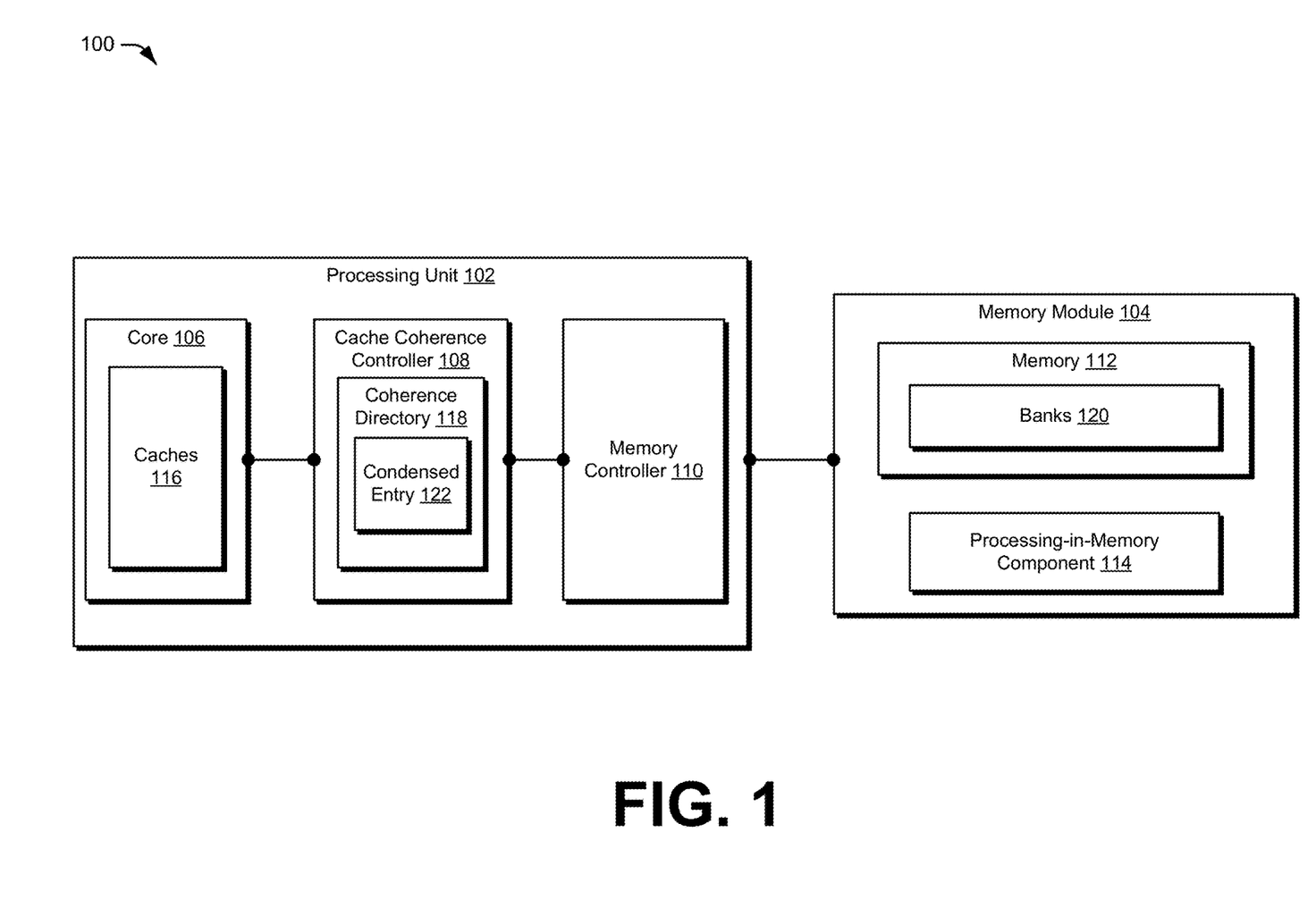
FIG. 1 is a block diagram of a non-limiting example system having a processing unit with a core, a cache coherence controller, and a memory controller coupled to a memory module having a memory and a processing-in-memory component.

FIG. 1 is a block diagram of a non-limiting example system 100 having a processing unit with a core, a cache coherence controller, and a memory controller coupled to a memory module having a memory and a processing-in-memory component. In particular, the system 100 includes a processing unit 102 and a memory module 104. The processing unit 102 includes a core 106, a cache coherence controller 108, and a memory controller 110. The memory module 104 includes a memory 112 and a PIM component 114.

In accordance with the described techniques, the processing unit 102 and the memory module 104 are coupled to one another via a wired or wireless connection. The core 106, the cache coherence controller 108, and the memory controller 110 are also coupled to one another via one or more wired or wireless connections. Example wired connections include, but are not limited to, buses (e.g., a data bus), interconnects, traces, and planes. Examples of devices in which the system 100 is implemented include, but are not limited to, supercomputers and/or computer clusters of high-performance computing (HPC) environments, servers, personal computers, laptops, desktops, game consoles, set top boxes, tablets, smartphones, mobile devices, virtual and/or augmented reality devices, wearables, medical devices, systems on chips, and other computing devices or systems.

The processing unit 102 is an electronic circuit that performs various operations on and/or using data in the memory 112. Examples of the processing unit 102 and/or the core 106 include, but are not limited to, a central processing unit (CPU), a graphics processing unit (GPU), a field programmable gate array (FPGA), an accelerated processing unit (APU), and a digital signal processor (DSP). For example, the core 106 is a processing unit that reads and executes commands (e.g., of a program), examples of which include to add data, to move data, and to branch. Although one core 106 is depicted in the example system 100, in variations, the processing unit 102 includes more than one core 106, e.g., the processing unit 102 is a multi-core processor.

In one or more implementations, the memory module 104 is a circuit board (e.g., a printed circuit board), on which the memory 112 is mounted and includes the PIM component 114. In variations, one or more integrated circuits of the memory 112 are mounted on the circuit board of the memory module 104, and the memory module 104 includes multiple PIM components 114. Examples of the memory module 104 include, but are not limited to, single in-line memory module (SIMM), dual in-line memory module (DIMM), high-bandwidth memory (HBM), and TransFlash memory module. In one or more implementations, the memory module 104 is a single integrated circuit device that incorporates the memory 112 and the PIM component 114 on a single chip. In some examples, the memory module 104 is composed of multiple chips that implement the memory 112 and the PIM component 114 that are vertically ("3D") stacked together, are placed side-by-side on an interposer or substrate, or are assembled via a combination of vertical stacking or side-by-side placement.

The memory 112 is a device or system that is used to store information, such as for immediate use in a device, e.g., by the core 106 of the processing unit 102 and/or by the PIM component 114. In one or more implementations, the memory 112 corresponds to semiconductor memory where data is stored within memory cells on one or more integrated circuits. In at least one example, the memory 112 corresponds to or includes volatile memory, examples of which include random-access memory (RAM), dynamic random-access memory (DRAM), synchronous dynamic random-access memory (SDRAM), and static random-access memory (SRAM). Alternatively or in addition, the memory 112 corresponds to or includes non-volatile memory, examples of which include solid state disks (SSD), flash memory, read-only memory (ROM), programmable read-only memory (PROM), erasable programmable read-only memory (EPROM), and electronically erasable programmable read-only memory (EEPROM). Thus, the memory 112 is configurable in a variety of ways that support condensed coherence directory entries for processing-in-memory without departing from the spirit or scope of the described techniques.

The memory controller 110 is a digital circuit that manages the flow of data to and from the memory 112. By way of example, the memory controller 110 includes logic to read and write to the memory 112. In one or more implementations, the memory controller 110 also includes logic to read and write to registers (e.g., temporary data storage) maintained by the PIM component 114, and to interface with the PIM component 114, e.g., to provide commands to the PIM component 114 for processing by the PIM component 114. The memory controller 110 also interfaces with the core 106. For instance, the memory controller 110 receives commands from the core 106, via the cache coherence controller 108, which involve accessing the memory 112, and/or the registers of the PIM component 114 and provides data to the core 106, e.g., for processing by the core 106. In one or more implementations, the memory controller 110 is communicatively located between the core 106 and the memory module 104, and the memory controller 110 interfaces with the core 106, the memory module 104, and the cache coherence controller 108.

Broadly, the PIM component 114 corresponds to or includes one or more in-memory processors, e.g., embedded within the memory module 104. The in-memory processors are implemented with example processing capabilities ranging from relatively simple (e.g., an adding machine) to relatively complex (e.g., a CPU/GPU compute core). The processing unit 102 is configured to offload memory bound computations to the one or more in-memory processors of the PIM component 114. To do so, the core 106 generates PIM commands and transmits the PIM commands, via the memory controller 110, to the memory module 104. The PIM component 114 receives the PIM commands and processes the PIM commands using the one or more in-memory processors and utilizing data stored in the memory 112.

Processing-in-memory using in-memory processors contrasts with standard computer architectures which obtain data from memory 112, communicate the data to the core 106 of the processing unit 102, and process the data using the core 106 rather than the PIM component 114. In various scenarios, the data produced by the core 106 as a result of processing the obtained data is written back to the memory 112, which involves communicating the produced data over the pathway from the core 106 to the memory 112. In terms of data communication pathways, the core 106 is further away from the memory 112 than the PIM component 114. As a result, these standard computer architectures suffer from increased data transfer latency, reduced data communication bandwidth, and increased data communication energy, particularly when the volume of data transferred between the memory and the processing unit 102 is large, which can also decrease overall computer performance.

Thus, the PIM component 114 enables increased computer performance while reducing data transfer energy as compared to standard computer architectures which use the core 106 of the processing unit 102 to process data. Further, the PIM component 114 alleviates memory performance and energy bottlenecks by moving one or more memory-intensive computations closer to the memory 112. Although the PIM component 114 is illustrated as being disposed within the memory module 104, it is to be appreciated that in some examples, the described benefits of condensed coherence directory entries for processing-in-memory are realizable through near-memory processing implementations in which the PIM component 114 is disposed in closer proximity to the memory 112 (e.g., in terms of data communication pathways and/or topology) than the core 106 of the processing unit 102.

In one or more implementations, the core 106 retrieves data from the memory 112 and stores the data in one or more caches 116 of the core 106. By way of example, the caches 116 of the core 106 include a level 1 cache and a level 2 cache. In implementations in which the core 106 is a multi-core processor, a level 3 cache is shared by each of the multiple cores 106. Thus, in these implementations, each core 106 of the multi-core processor is able to store data in a level 1 cache, a level 2 cache, and a shared level 3 cache. In terms of data communication pathways, the caches 116 are closer to the core 106 than the memory 112, and as such, data stored in the caches 116 is accessible faster by the core 106 than data stored in the memory 112. It is to be appreciated that the one or more cores 106 of the processing unit 102 can include cache subsystems with differing numbers of caches and different hierarchical structures without departing from the spirit or scope of the described techniques.

In various examples, the core 106 retrieves data for storage in a cache line of one of the caches 116 in response to receiving a command to access a particular memory address. As used herein, a "cache line" is a unit of data transfer between the memory 112 and the caches 116. In one example, the cache line is four bytes and the core 106 retrieves a contiguous four-byte block of data from the memory 112 that includes the data of the particular memory address. Further, the core 106 stores the four-byte block of data as a cache line in the caches 116. If the core 106 receives a subsequent command to access a memory address that is a part of the cache line, the core 106 accesses the data of the memory address from the caches 116, rather than the memory 112.

In one or more examples, the caches 116 and the memory 112 store different versions of a corresponding cache line. For instance, the core 106 modifies data of a cache line that is stored in a cache 116, and as such, the data corresponding to the cache line that is stored in the memory 112 is stale. Accordingly, the cache coherence controller 108 is employed to enforce cache coherence among the caches 116 and the memory 112. Notably, cache coherence is the uniformity of data that is storable in multiple different memory resources in a system, e.g., the caches 116 and the memory 112. As part of enforcing cache coherence, the cache coherence controller 108 employs a coherence directory 118, which includes entries for cache lines that are stored in one or more of the caches 116. In response to a cache line being added to the caches 116, the cache coherence controller 108 creates an entry in the coherence directory 118 that includes a range of memory addresses corresponding to the cache line.

Broadly, the cache coherence controller 108 receives a command to access data of a particular memory address from the memory 112, and in response, performs a lookup in the coherence directory 118 for an entry that represents a cache line that includes the particular memory address. Based on a result of the lookup, the cache coherence controller performs a corresponding coherence protocol. By way of example, a coherence directory miss occurs when there is no entry in the coherence directory 118 having an address range that includes the particular memory address. In contrast, a coherence directory hit occurs when there is an entry in the coherence directory having an address range that includes the particular memory address.

Responsive to a coherence directory miss, the cache coherence controller 108 forwards the command to the memory controller 110 to access the data from the memory 112. Responsive to a coherence directory hit, the cache coherence controller 108 initiates a "hit coherence protocol" which includes determining a coherence state of the cache line. By way of example, a coherence state is included as part of the coherence directory entry, and the cache coherence controller 108 evaluates the coherence directory entry to determine the coherence state, which in various examples, is modified, owned, exclusive, shared, invalid, and so on. Additionally or alternatively, the coherence state is included as part of the cache line stored in the caches 116, and the cache coherence controller 108 obtains the coherence state from the caches 116. If the coherence state indicates that the memory 112 stores the latest version of the cache line (e.g., the data of the cache line is not modified in the caches 116), the hit coherence protocol includes forwarding the command to the memory controller 110 to access the data from the memory 112. If the coherence state indicates that the memory 112 does not store the latest version of the cache line (e.g., the data of the cache line is modified in the caches 116), the hit coherence protocol further includes instructing the core 106 to write the data of the cache line back to the corresponding memory address in the memory 112, and optionally, invalidate the cache line in the caches 116 to ensure coherence among the different instances of the data.

In some examples, the memory 112 includes a plurality of banks 120 that are organized into one or more memory arrays (e.g., grids), which include rows and columns such that data is stored in individual cells of the memory arrays. In one or more implementations, the banks 120 are representative of a grouping of banks 120 in relation to which the PIM component 114 is configured to perform various in-memory processing operations. By way of example, the PIM component 114 is included as part of a memory channel along with the banks 120, and the PIM component 114 performs in-memory processing operations on the data that is stored in the banks 120. In variations, the system includes a plurality of memory channels, each including a respective PIM component 114, a set of banks on which the PIM component 114 operates, and a cache coherence controller 108 to enforce cache coherence among the set of banks within the memory channel and the caches 116.

In one or more implementations, the PIM component 114 is configured to operate on each of the banks 120 in parallel to execute a single PIM command. Consider an example in which the PIM component 114 is configured to operate on sixteen banks 120 and the PIM component 114 receives a PIM command to read data from a particular row and column address. To execute the command, the PIM component 114 reads the data of the particular row and column address from each bank 120 of the memory channel in parallel.

Given this, a single PIM command of a conventionally configured system triggers many lookups in the coherence directory 118—one lookup for each of the multiple banks 120 that the PIM component 114 operates on. This ensures that the requested data stored in each bank 120 is coherent with other instances of the requested data stored in the caches 116. Continuing with the previous example in which the PIM component 114 is configured to operate on sixteen banks 120, a standard cache coherence controller performs sixteen coherence directory lookups for a single PIM command. Notably, a coherence directory lookup is a computationally expensive task, particularly when many (e.g., sixteen) coherence directory lookups are performed sequentially. Moreover, the many coherence directory requests performed for a single PIM command often create a bottleneck in the coherence directory that affects both PIM workloads and non-PIM workloads. These problems are exacerbated by the notion that PIM commands are often issued together as a series of sequential PIM commands, rather than interspersed with non-PIM commands. Due to this, the number of coherence directory lookups to be performed multiplies with each sequential PIM command, thereby worsening the bottleneck and increasing coherence directory lookup latency.

To overcome these drawbacks of conventional techniques, the cache coherence controller 108 is configured to create a condensed entry 122 in the coherence directory 118 which tracks the cache status of a particular memory address for each of the banks 120 that the PIM component 114 operates on. To do so, the cache coherence controller 108 receives an initial PIM command to a particular memory address. In response, the cache coherence controller 108 performs a series of initial lookups in the coherence directory 118—one for each bank of the multiple banks 120 that the PIM component 114 operates on. Responsive to the initial lookups, the cache coherence controller creates a condensed entry 122 in the coherence directory 118 which tracks a cache status of all of the banks 120, e.g., whether any of the banks have a corresponding version of the data of the memory address 204 stored in the caches 116.

In accordance with the described techniques, the cache coherence controller 108 receives a subsequent PIM command to the particular memory address. Instead of performing coherence directory lookups on each of the individual banks 120, the cache coherence controller performs one lookup in the coherence directory 118 on the condensed entry 122. In one or more implementations, the condensed entry 122 indicates that the data of the particular memory address is not stored in the caches 116 for any of the banks 120. In these implementations, the cache coherence controller 108 forwards the subsequent PIM command to the memory controller 110 without performing any additional coherence directory lookups for the PIM command. Thus, in an example in which the PIM component 114 operates on sixteen banks 120 of the memory 112, the condensed entry 122 performs one coherence directory lookup for the subsequent PIM command, whereas conventional techniques perform sixteen coherence directory lookups. Thus, the described techniques decrease lookup latency in the coherence directory 118 and alleviate coherence directory bottlenecks by reducing the number of coherence directory lookups for PIM commands.

Figure 2:
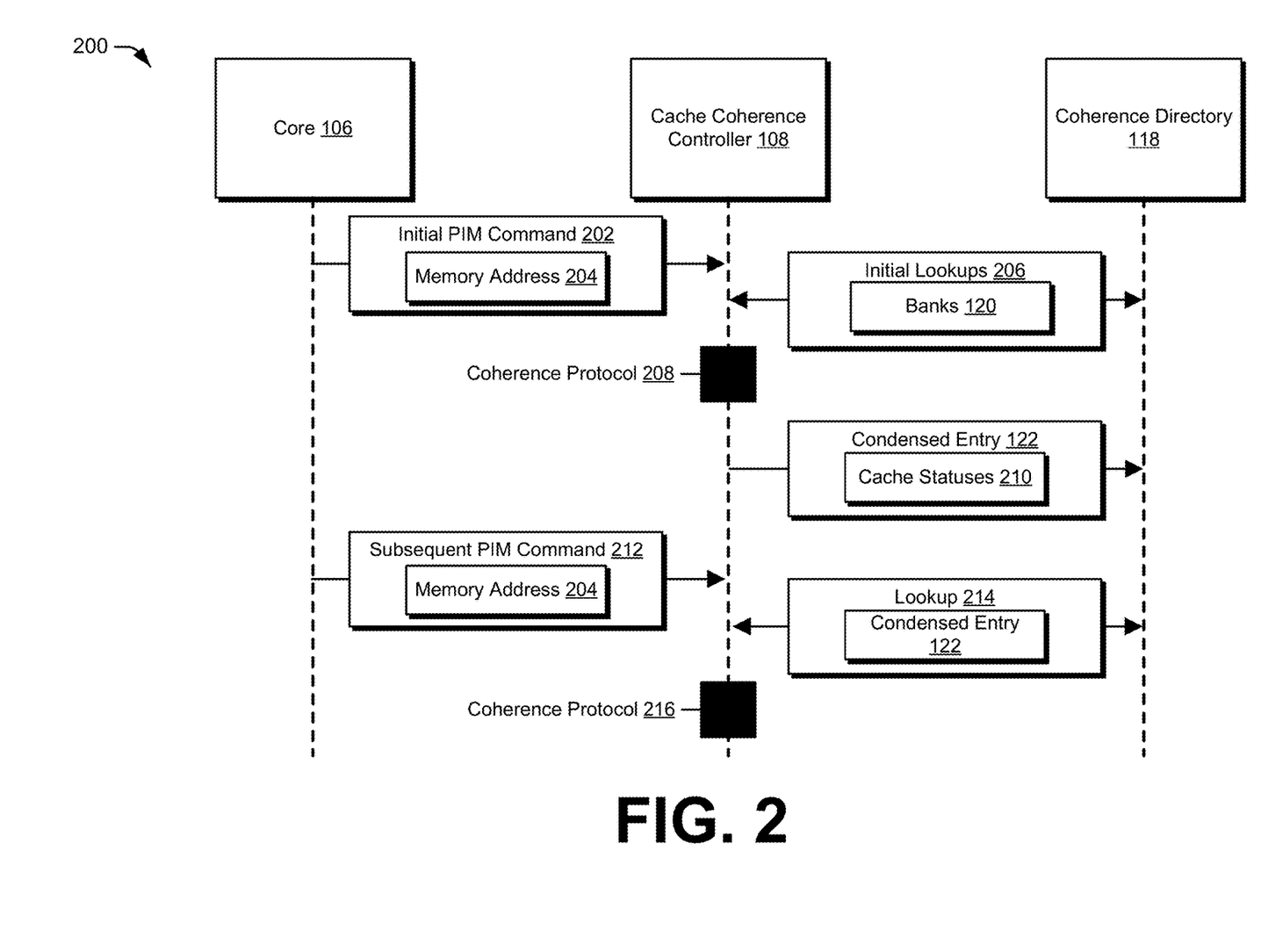
FIG. 2 depicts a non-limiting example in which a cache coherence controller performs a single coherence directory lookup for a processing-in-memory command.

FIG. 2 depicts a non-limiting example 200 in which a cache coherence controller performs a single coherence directory lookup for a processing-in-memory command. Example 200 includes the core 106, the cache coherence controller 108, and the coherence directory 118. As shown, the cache coherence controller 108 receives an initial PIM command 202 to access a memory address 204 from the core 106. In one or more examples, the initial PIM command 202 is a PIM-load command instructing the PIM component 114 to read data from the memory address 204. Additionally or alternatively, the initial PIM command 202 is a PIM-store command instructing the PIM component 114 to write data to the memory address 204. As used herein, the term "memory address data" refers to data that is stored in one or more of the banks 120 at the memory address 204.

Responsive to receiving the initial PIM command 202, the cache coherence controller 108 performs initial lookups 206 in the coherence directory 118 on each of the multiple banks 120. In an example in which the PIM component 114 operates on sixteen banks 120, the cache coherence controller 108 performs sixteen initial lookups 206 for the memory address 204—one for each of the sixteen banks 120. The cache coherence controller 108 further initiates a coherence protocol 208 depending on the results of the initial lookups 206. In accordance with the described techniques, the cache coherence controller 108 is configured to create a condensed entry 122 for the memory address 204 responsive to the initial lookups 206. Since a subsequent PIM command to the memory address 204 is configured to trigger just one lookup in the coherence directory 118 for the condensed entry 122, the condensed entry 122 is configured to convey that the caches 116 do not store a version of the memory address data. Therefore, in one or more implementations, the coherence protocol 208 includes invalidating any of the memory address data that is stored in the caches 116. In this way, the memory 112 stores the only valid version of the memory address data after the initial lookups 206 are performed.

Thus, in one example, an initial lookup 206 for a first bank 120 results in a coherence directory miss, and as such, the coherence protocol 208 involves no further coherence action with respect to the first bank 120 since the coherence directory miss indicates that the only valid version of the memory address data of the first bank 120 is stored in the memory 112. In another example, an initial lookup for a second bank 120 results in a coherence directory hit and the coherence state indicates that the memory address data is modified in the caches 116. In accordance with this example, the coherence protocol 208 includes instructing the core 106 to write the modified memory address data back to the memory address 204 of the second bank 120, and invalidate the memory address data in the caches 116. In yet another example, an initial lookup for a third bank 120 results in a coherence directory hit and the coherence state indicates that the memory address data is not modified in the caches 116. In accordance with this example, the coherence protocol 208 includes instructing the core 106 to invalidate the memory address data in the caches 116 without writing the memory address data back to memory 112. This is because the memory 112 already stores the latest version of the memory address data. Therefore, the coherence protocol 208 ensures that the memory 112 stores the only valid version of the memory address data.

Responsive to the initial lookups, the cache coherence controller 108 creates the condensed entry 122 for the memory address 204 and stores the condensed entry 122 in the coherence directory 118. In some implementations, inclusion of the condensed entry 122 in the coherence directory 118 indicates that none of the banks 120 have a corresponding version of the memory address data stored in the caches 116. Additionally or alternatively, the condensed entry 122 includes cache statuses 210 each indicating whether an individual bank 120 or a sub-grouping of the banks 120 have a corresponding version of the memory address data stored in the caches 116. Notably, the condensed entry 122 leverages the existing structure of traditional coherence directory entries. In other words, the condensed entry 122 has the same structure (e.g., number of bits) as a traditional coherence directory entry, but the condensed entry 122 conveys different and/or additional information. Namely, the different and/or additional information is that the condensed entry 122 represents each of the banks 120, while a traditional coherence directory entry represents a single bank.

Figure 3:
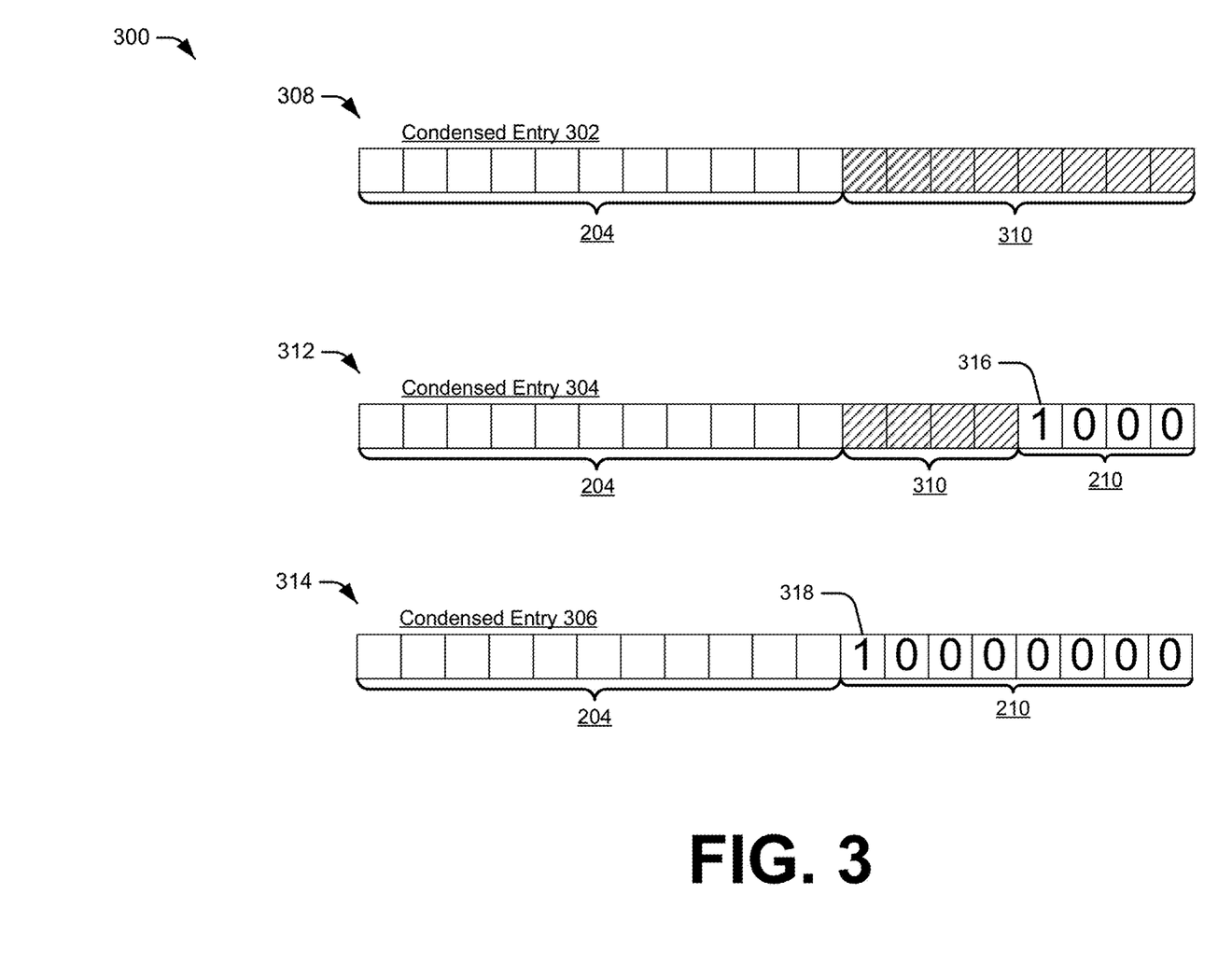
FIG. 3 depicts a non-limiting example showing example condensed entries in accordance with one or more implementations.

FIG. 3 depicts a non-limiting example 300 showing example condensed entries in accordance with one or more implementations. In the example 300, the example condensed entries 302, 304, 306 include a number of bits where information regarding the corresponding condensed entries 302, 304, 306 are stored. As shown, one or more bits of the example condensed entries 302, 304, 306 are utilized to store the memory address 204. In the example 300, the PIM component 114 performs in-memory processing operations on eight banks 120. As mentioned above, the coherence protocol 208 involves invalidating any data in the cache 116 corresponding to the memory address 204 that is stored in the caches 116. Thus, after the coherence protocol 208 is performed, the memory 112 stores the only valid version of the memory address data.

In a first example 308, the cache coherence controller 108 creates a condensed entry 302 that does not include bits for storing the cache status 210 of individual banks 120 or sub-groupings of banks 120. Rather, the condensed entry 302 includes bits for the memory address 204, and one or more bits 310 that are not used to store cache statuses, and instead store other types of information. In the first example 308, inclusion of the condensed entry 302 (which is not invalidated) in the coherence directory 118 indicates that none of the eight banks have a corresponding version of the memory address data stored in the caches 116.

In accordance with the described techniques, the core 106 receives a subsequent non-PIM command for the memory address 204 and an individual bank 120. As part of processing the subsequent non-PIM command, the core 106 is configured to retrieve data for a cache line from the memory 112 that includes the data of the memory address 204, and store the data in a cache line in one of the caches 116. Thus, in response to receiving the subsequent non-PIM command from the core 106, the cache coherence controller 108 performs a lookup in the coherence directory 118 for the memory address 204 and the individual bank 120. In response to a coherence directory miss in the first example 308, the cache coherence controller 108 creates an entry in the coherence directory 118 for the cache line that includes the memory address 204 and the individual bank 120, and invalidates the condensed entry 122. This is because a coherence directory miss indicates to the cache coherence controller 108 that the data of the memory address 204 and the individual bank 120 was not previously cached, but is now being cached by the subsequent non-PIM command. Thus, in the first example 308 in which the condensed entry 122 does not include bits for the cache statuses 210 (e.g., the condensed entry 302), the condensed entry 122 is invalidated in response to data represented by the condensed entry 122 being stored in the caches 116.

In contrast, a coherence directory hit indicates to the cache coherence controller 108 that the data of the memory address 204 and the individual bank 120 is already cached, and as such, the condensed entry 122 has already been invalidated. Thus, in response to a coherence directory hit, the cache coherence controller 108 performs the above-described hit coherence protocol with respect to the entry in the coherence directory 118.

In one or more implementations, the cache coherence controller 108 repurposes unused bits of the condensed entry 122 as a bit vector to store the cache statuses 210. By way of example, a traditional coherence directory entry includes bits to track the bank identification and coherence state for data of a cache line that is stored in the caches 116. However, the condensed entry 122 does not track the coherence state since any individual bank represented by the condensed entry 122 and having data stored in the caches 116 is also represented by a traditional coherence directory entry for the individual bank that does track the coherence state. Moreover, the condensed entry 122 does not track the bank identification since the condensed entry 122 represents all of the banks 120 that the PIM component 114 operates on. Thus, in examples 312, 314, the condensed entry 122 leverages the bits typically used for the bank identification and the coherence state in traditional coherence directory entries to track one or more cache statuses 210 of the banks 120.

In a second example 312, the cache coherence controller 108 creates a condensed entry 304 that includes multiple cache statuses 210 each indicating whether the data associated with the memory address 204 and a sub-grouping of the banks 120 is stored in the caches 116. By way of example, the condensed entry 304 includes bits for the memory address 204, one or more bits 310 that are not used to store cache statuses, e.g., and instead store other types of information. Furthermore, the condensed entry 304 includes four unused bits that are repurposed to store cache statuses 210, and each bit represents two banks of the eight banks. In the second example 312, a cache status 210 set to a value of '0' indicates that the data of the memory address 204 and the individual banks 120 in a respective sub-grouping is not stored in the caches 116. Further, a cache status 210 set to a value of '1' indicates that the data of the memory address 204 and at least one individual bank 120 in a respective sub-grouping is stored in the caches 116.

Since the cache lines corresponding to the memory address 204 are invalidated in the caches 116 after the coherence protocol 208 is performed, the cache statuses 210 of the condensed entry 304 are initially set to a value of '0.' In accordance with the described techniques, a subsequent non-PIM request to the memory address 204 and a particular bank 120 is received, which causes a version of the memory address data to be stored in the caches 116, as discussed above. In response to a coherence directory hit, the cache coherence controller 108 performs the above-described hit coherence protocol with respect to the entry in the coherence directory. In response to a coherence directory miss, the cache coherence controller 108 creates an entry in the coherence directory 118 for the cache line that includes the memory address 204 and the individual bank 120. In the second example 312, rather than invalidate the entire condensed entry 304, the cache coherence controller 108 modifies the cache status 210 of the sub-grouping that includes the particular bank to indicate that the data of the sub-grouping is stored in the caches 116. Therefore, in the second example 312, when a subsequent non-PIM command causes the memory address data of the particular bank 120 to be stored in the caches 116, the memory address data of the particular bank is represented twice in the coherence directory 118. For instance, the memory address data of the particular bank is represented by a corresponding cache status 210 in the condensed entry 304, and is also represented by a traditional coherence directory entry.

In the second example 312, a non-PIM request causes the memory address data of a first bank 120 to be stored in the caches 116, and a first bit 316 of the condensed entry 304 represents the cache status 210 of first and second banks of the eight banks. In this example, the cache coherence controller 108 is employed to modify the cache status 210 of the first bit 316 to a value of '1,' indicating that at least one of the first bank or the second bank have a version of the memory address data stored in the caches 116. Thus, in the second example 312 in which the condensed entry 122 includes bits for the cache statuses 210 of sub-groupings of the banks 120 (e.g., the condensed entry 304), only the cache status 210 of the corresponding sub-grouping is modified (e.g., to a value of '1') in response to data represented by the condensed entry 122 being stored in the caches 116.

In a third example 314, the cache coherence controller 108 creates a condensed entry 306 that includes multiple cache statuses 210 each indicating whether the data associated with the memory address 204 and an individual bank 120 is stored in the caches 116. By way of example, the condensed entry 306 includes bits for the memory address 204, and eight unused bits that are repurposed to store cache statuses 210. In the third example 312, each bit represents an individual bank 120 of the eight banks. Accordingly, a cache status 210 set to a value of '0' indicates that the data of the memory address 204 and a respective individual bank is not stored in the caches 116. Further, a cache status 210 set to a value of '1' indicates that the data of the memory address 204 and a respective individual bank is stored in the caches 116.

Since the cache lines corresponding to the memory address 204 are invalidated in the caches 116 after the coherence protocol 208 is performed, the cache statuses 210 of the condensed entry 306 are initially set to a value of '0.' In accordance with the described techniques, a subsequent non-PIM request to the memory address 204 and a particular bank 120 is received, which causes a version of the memory address data to be stored in the caches 116, as discussed above. In response to a coherence directory hit, the cache coherence controller 108 performs the above-described hit coherence protocol with respect to the entry in the coherence directory. In response to a coherence directory miss, the cache coherence controller 108 creates an entry in the coherence directory 118 for the cache line that includes the memory address 204 and the individual bank 120. In the third example 314, rather than invalidate the entire condensed entry 306, the cache coherence controller 108 modifies the cache status 210 of the individual bank to indicate that the data of the individual bank is stored in the caches 116. Therefore, in the third example 314, when a subsequent non-PIM command causes the memory address data of the individual bank 120 to be stored in the caches 116, the memory address data of the individual bank is represented twice in the coherence directory 118. For instance, the memory address data of the individual bank is represented by a corresponding cache status 210 in the condensed entry 304, and is also represented by a traditional coherence directory entry.

In the third example 314, a non-PIM request causes data of the memory address 204 and a first bank 120 to be stored in the caches 116 and a first bit 318 of the condensed entry 306 represents the cache status 210 of a first bank of the eight banks. In this example, the cache coherence controller 108 is employed to modify the cache status 210 of the first bit 318 to a value of '1,' indicating that the data of the memory address 204 and the first bank is stored in the caches 116. Thus, in implementations in which the condensed entry 122 includes bits for the cache statuses 210 of individual banks 120 (e.g., the condensed entry 306), only the cache status 210 of the corresponding individual bank is modified (e.g., to a value of '1') in response to data represented by the condensed entry 122 being stored in the caches 116.

Returning to FIG. 2, the cache coherence controller 108 stores the condensed entry 122 in the coherence directory 118, and receives a subsequent PIM command 212 to access the memory address 204 from the core 106. As shown, the cache coherence controller 108 performs one lookup 214 in the coherence directory 118 for a condensed entry 122 having the memory address 204. In response to a condensed entry hit (e.g., a valid condensed entry 122 having the memory address 204 exists in the coherence directory 118), the cache coherence controller 108 initiates a coherence protocol 216 based on inclusion of the valid condensed entry 122 in the coherence directory and/or the one or more cache statuses 210 of the condensed entry.

In implementations in which the condensed entry 122 does not include bits for the cache statuses 210 of the banks 120 (e.g., the condensed entry 302), inclusion of the valid condensed entry 122 in the coherence directory 118 indicates that the caches 116 do not store the memory address data. In these implementations, the coherence protocol 216 involves forwarding the subsequent PIM command 212 to the memory controller 110 to access the data of the memory address 204 from the memory 112 in response to a condensed entry hit. Notably, the cache coherence controller 108 does so without performing additional lookups in the coherence directory 118 on individual banks 120. In other words, the cache coherence controller 108 performs only one lookup in the coherence directory 118 for the subsequent PIM command 212 based on a valid condensed entry 122 having the memory address 204 being included in the coherence directory 118.

In implementations in which the condensed entry 122 includes bits for the cache statuses 210 (e.g., condensed entry 304 and condensed entry 306), the cache coherence controller 108 is configured to evaluate the cache statuses 210 of the condensed entry 122 in response to a condensed entry hit. In one or more examples, each of the cache statuses 210 indicate that the memory address data is not stored in the caches 116. For instance, the cache statuses 210 associated with each sub-grouping of banks 120 in the condensed entry 304 is set to a value of '0.' Additionally or alternatively, the cache statuses 210 associated with each individual bank 120 in the condensed entry 306 is set to a value '0.' Given this, the coherence protocol 216 involves forwarding the subsequent PIM command 212 to the memory controller 110 to access the data of the memory address 204 from the memory 112, without performing additional lookups in the coherence directory 118 on individual banks 120. In other words, the cache coherence controller 108 performs only one lookup in the coherence directory 118 for the subsequent PIM command 212 based on each of the cache statuses 210 of the condensed entry 122 indicating that the memory address data is not stored in the caches 116.

Therefore, there are situations in which a condensed entry 122 exists in the coherence directory 118 and none of the memory address data represented by the condensed entry 122 is stored in the caches 116, e.g., when a condensed entry that does not include cache statuses 210 is included in the coherence directory 118 or when a condensed entry that does include cache statuses 210 has all cache statuses 210 set to a value of '0.' In these situations, the coherence protocol 216 involves forwarding the subsequent PIM command 212 to the memory controller 110 to access the data of the memory address 204 from the memory 112 without performing additional lookups in the coherence directory 118. In other words, the cache coherence controller 108 skips (1) performing lookups in the coherence directory 118 for individual banks to determine whether the memory address data of the individual banks is stored in the cache, (2) determining states of cached data to determine whether the caches 116 store a modified version of the memory address data, and (3) writing the memory address data back to the memory 112, and optionally, invalidating the cached data.

In the following discussion, consider an implementation in which the condensed entry 122 includes multiple cache statuses 210 each indicating whether the memory address data of a sub-grouping of the banks 120 is stored in the caches 116, e.g., condensed entry 304. In implementations, one or more of the cache statuses 210 indicate that the memory address data is stored in the caches, e.g., at least one of the cache statuses 210 is set to a value of '1.' Given this, the coherence protocol 216 involves performing additional lookups in the coherence directory 118 on only the individual banks that are included in the sub-grouping(s) that have a cache status 210 set to a value of '1.'

Consider the previous example in which the first bit 316 of the condensed entry 304 is set to a value of '1' indicating that the sub-grouping of the eight banks 120 that includes the first and second banks has a corresponding version of the memory address data stored in the caches 116. In addition to the lookup 214 on the condensed entry in this example, the cache coherence controller 108 performs an additional coherence directory lookup on the first bank and an additional coherence directory lookup on the second bank. Responsive to a coherence directory miss on a respective individual bank, no further coherence action is performed with respect to the respective individual bank. Responsive to a coherence directory hit on a respective individual bank, the cache coherence controller 108 initiates the hit coherence protocol with respect to the individual bank. In this example, a number of coherence directory lookups are reduced from eight, performed by conventional techniques, to three, performed by the described techniques for condensed coherence directory entries for processing-in-memory. For instance, the cache coherence controller 108 performs the lookup 214 on the condensed entry 304, a first additional lookup on the first bank represented by the first bit 316 of the condensed entry 304, and a second additional lookup on the second bank represented by the first bit 316 of the condensed entry 304.

In the following discussion, consider an implementation in which the condensed entry 122 includes multiple cache statuses 210 each indicating whether the memory address data of an individual bank 120 is stored in the caches 116, e.g., the condensed entry 306. In implementations, one or more of the cache statuses 210 indicate that the memory address data is stored in the caches 116, e.g., at least one of the cache statuses 210 is set to a value of '1.' Given this, the coherence protocol 216 involves performing additional lookups in the coherence directory 118 on only the individual banks 120 that have a corresponding cache status 210 set to a value of '1.'

Consider the previous example in which the first bit 318 of the condensed entry 306 is set to a value of '1' indicating that the first bank of the eight banks 120 has a corresponding version of the memory address data stored in the caches 116. In addition to the lookup 214 on the condensed entry in this example, the cache coherence controller 108 performs an additional coherence directory lookup on the first bank. Responsive to a coherence directory miss on the first bank, no further coherence action is performed with respect to the first bank. Responsive to a coherence directory hit on the first bank, the cache coherence controller 108 initiates the hit coherence protocol with respect to the first bank. In this example, a number of coherence directory lookups are reduced from eight, performed by conventional techniques, to two, performed by the described techniques for condensed coherence directory entries for processing-in-memory. For instance, the cache coherence controller 108 performs the lookup 214 on the condensed entry 306 and an additional lookup on the first bank represented by the first bit 318 of the condensed entry 306.

In one or more examples, the condensed entry 122 includes a bit flag indicating that the entry is a condensed entry 122 rather than a typical coherence directory entry. Although not shown, the bit flag is representable by one of the bits 310 of condensed entry 302 and condensed entry 304 of FIG. 3 that are used to store information other than the memory address 204 and the cache statuses 210. By way of example, a dedicated bit in the condensed entry 122 is set to a value of '1' indicating that the entry is a condensed entry 122 which tracks the cache status of each bank 120 of a particular memory address. In contrast, the dedicated bit in a typical coherence directory is set to a value of '0.' Thus, during the lookup 214 for the condensed entry 122, the cache coherence controller 108 searches the entries in the coherence directory 118 having the bit flag set to a value of '1' and skips the entries in the coherence directory 118 having the bit flag set to a value of '0.' In other words, the cache coherence controller 108 only searches the condensed entries 122 in the coherence directory 118 while performing a coherence directory lookup for a condensed entry.

In one or more implementations, the coherence directory 118 includes a dedicated region for storing memory addresses that relate to PIM workloads. In one or more implementations, the dedicated region in the coherence directory 118 includes one or more address ranges which identify rows of the banks 120 that relate to PIM workloads. In response to receiving a PIM command to a particular memory address, the cache coherence controller 108 updates the dedicated region to include an indication of the particular memory address. By way of example, the cache coherence controller 108 checks whether the address ranges include a row of the memory address 204 in response to receiving the initial PIM command 202. If the address ranges do not include the row of the memory address 204, the cache coherence controller 108 updates one of the address ranges to include the row and/or creates a new address range in the dedicated region that includes the row.

Based on whether a memory address associated with a non-PIM command is included in the dedicated region, the cache coherence controller 108 either initiates or bypasses a lookup for the condensed entry. In the following discussion consider an example in which a non-PIM command to an individual bank 120 and a particular memory address is received. The cache coherence controller 108 performs a lookup on the particular memory address and the individual bank 120, resulting in a coherence directory miss. The coherence directory miss indicates that the data of the particular memory address and the individual bank 120 was not previously cached, but is now being cached by the non-PIM command. Given this, the cache coherence controller 108 is configured to perform a further lookup for a condensed entry 122 having the particular memory address if the particular memory address is included in the address ranges. If a condensed entry 122 having the particular memory address exists in the coherence directory 118, the cache coherence controller 108 invalidates the condensed entry 122 (e.g., for implementations in which the condensed entry 122 does not include the cache statuses 210), or invalidates the cache status 210 corresponding to the individual bank 120, e.g., for implementations in which the condensed entry 122 includes the cache statuses 210.

However, the particular memory address not being included in the one or more address ranges of the dedicated region indicates to the cache coherence controller 108 that the non-PIM request does not affect memory addresses that relate to PIM workflows. Given this, there are no condensed entries 122 in the coherence directory 118 having the particular memory address. Therefore, if the particular memory address of the non-PIM command is not within the one or more address ranges of the dedicated region, the cache coherence controller 108 bypasses the further lookup for the condensed entry having the particular memory address. By doing so, the cache coherence controller 108 improves computational efficiency in processing non-PIM commands by eliminating the further lookup in situations in which a non-PIM command does not touch any addresses that relate to PIM workflows.

In one or more implementations, the coherence directory 118 has capacity to store a certain number of entries. Once the capacity is reached, an existing entry is evicted from the coherence directory 118 each time a new entry is inserted into the coherence directory 118. Typically, when evicting an entry from the coherence directory 118, the cache coherence controller 108 broadcasts evictions to the one or more cores 106 instructing the cores 106 to write the cached data back to the corresponding memory address in the memory 112 and invalidate the cache line that includes the cached data. Consider an example in which an entry corresponding to a particular cache line is evicted from the coherence directory 118. In this example, the entry includes a coherence state indicating that the data of the particular cache line is modified in a particular cache 116. Based on the coherence state, the core 106 is instructed to write the data of the particular cache line back to the corresponding memory address in the memory 112 and invalidate the cache line.

Notably, there are two situations in which a condensed entry is evicted from the coherence directory 118. In a first situation, none of the banks 120 have a corresponding version of the memory address data stored in the caches 116, and as such, the cache coherence controller 108 need not instruct the core 106 to invalidate the cache line and write the data of the cache line back to memory 112. In a second situation, one or more of the banks have a corresponding version of the memory address data stored in the caches 116. However, if data represented by a condensed entry is cached, there exists a traditional entry in the coherence directory 118 for the individual bank having the cached data. By way of example, if data represented by a condensed entry is cached by a subsequent non-PIM command, a traditional entry is created in the coherence directory that represents the cached data. Thereafter, the cache coherence controller 108 invalidates the condensed entry 122 in its entirety or invalidates the cache status 210 representing the individual bank of the cache line. Thus, in this second situation, the cache coherence controller 108 need not instruct the core 106 to invalidate the cache line and write the data of the cache line back to memory 112. Rather, the cache coherence controller 108 does so when it is time to evict the traditional coherence directory entry that represents the cached data.

In one or more implementations, the cache coherence controller 108 implements a condensed-entry-first eviction policy in which the condensed entries are evicted before traditional coherence directory entries. This is because cache coherence controller 108 does not broadcast evictions of condensed entries 122 to the cores 106, and as such, evictions of the condensed entries 122 are computationally inexpensive. In additional or alternative implementations, the cache coherence controller 108 implements different eviction policies, such as, evicting the least recently used entry first, evicting invalidated entries first, or any combination of the aforementioned eviction policies.

Figure 4:
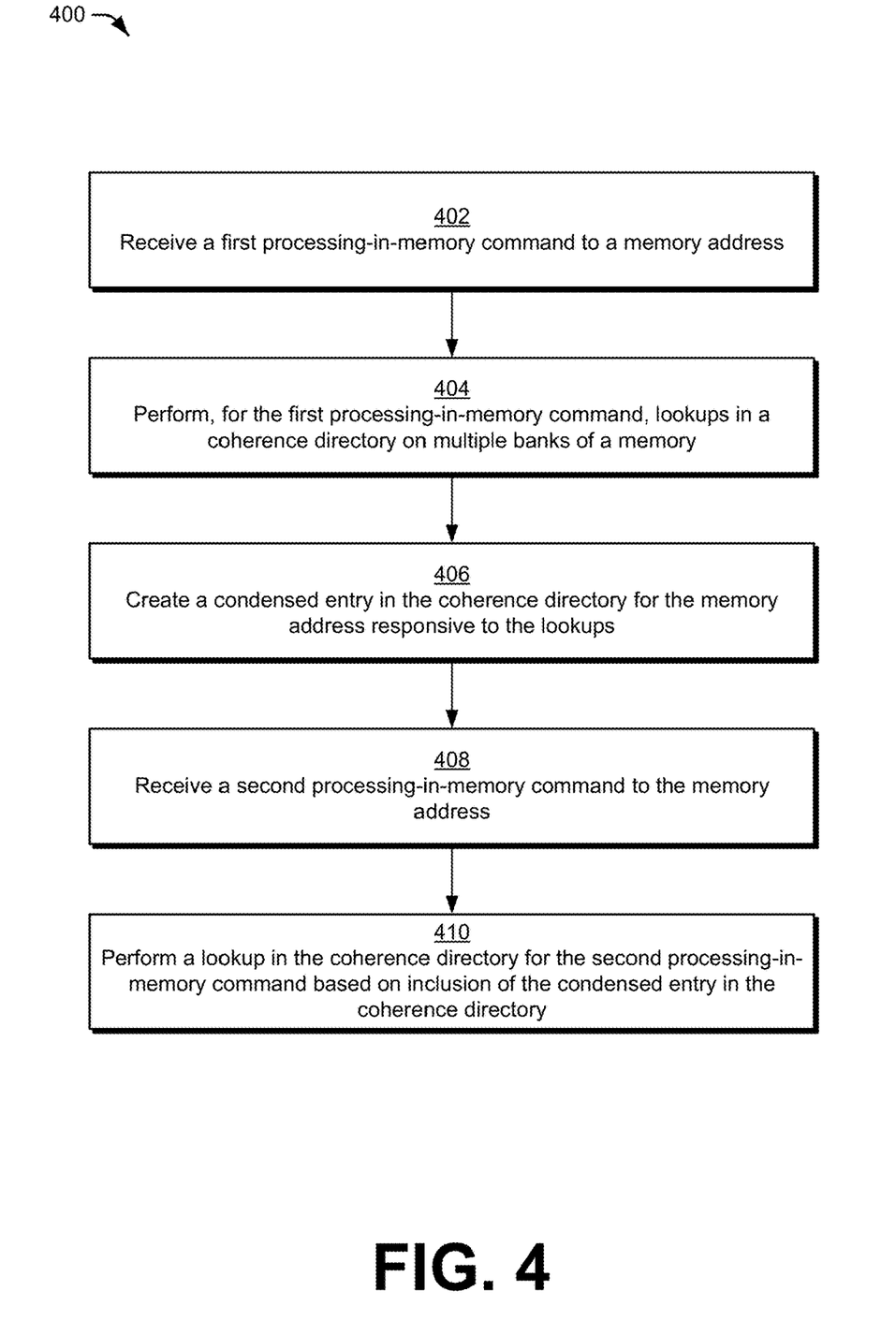
FIG. 4 depicts a procedure in an example implementation of condensed coherence directory entries for processing-in-memory.

FIG. 4 depicts a procedure 400 in an example implementation of condensed coherence directory entries for processing-in-memory. In the procedure 400, a first processing-in-memory command to a memory address is received (block 402). By way of example, the cache coherence controller 108 receives the initial PIM command 202 having the memory address 204.

Lookups are performed in a coherence directory for the first processing-in-memory command on multiple banks of a memory (block 404). By way of example, the cache coherence controller 108 performs the initial lookups 206 in the coherence directory 118 for the memory address 204 on each of the banks 120. Notably, the banks 120 correspond to a group of banks 120 with respect to which the PIM component 114 performs in-memory processing operations.

A condensed entry is created in the coherence directory for the memory address responsive to the lookups (block 406). By way of example, the cache coherence controller 108 creates the condensed entry 122, which tracks whether the banks 120 have a version of the data of the memory address 204 stored in one or more caches 116 of the core 106. In a first example implementation, the condensed entry 122 does not include bits for cache statuses 210 of individual banks 120 or sub-groupings of banks 120, e.g., the condensed entry 302. In accordance with the first example implementation, inclusion of a valid condensed entry 122 in the coherence directory 118 having the memory address 204 indicates that none of the banks 120 have a corresponding version of the memory address data stored in the caches 116. In a second example implementation, the condensed entry 122 includes bits for tracking the cache statuses 210 of sub-groupings of banks 120 (e.g., the condensed entry 304), and a respective cache status 210 indicates whether any of the banks 120 in the sub-grouping have a corresponding version of the memory address data stored in the caches 116. In a third example implementation, the condensed entry 122 includes bits for tracking the cache statuses 210 of individual banks 120 (e.g., the condensed entry 306), and a respective cache status indicates whether an individual bank has a corresponding version of the memory address data stored in the caches 116.

A second processing-in-memory command to the memory address is received (block 408). By way of example, the cache coherence controller 108 receives the subsequent PIM command 212 having the memory address 204.

A lookup is performed in the coherence directory for the second processing-in-memory command based on inclusion of the condensed entry in the coherence directory (block 410). By way of example, the cache coherence controller 108 performs a lookup 214 in the coherence directory for the condensed entry 122. In implementations in which the condensed entry 122 does not include the cache statuses 210, the cache coherence controller 108 forwards the subsequent PIM command 212 to the memory controller 110 without performing any additional lookups for individual banks based on the lookup 214 hitting in the coherence directory 118. In implementations in which the condensed entry does include the cache statuses 210, the cache coherence controller 108 evaluates the cache statuses 210 of the condensed entry 122 based on the lookup 214 hitting in the coherence directory 118. If each of the cache statuses 210 indicate that the data of the corresponding sub-grouping or individual bank is not stored in the caches 116, the cache coherence controller 108 similarly forwards the subsequent PIM command 212 to the memory controller 110 without performing any additional lookups for individual banks. If a cache status 210 indicates that the data of a corresponding sub-grouping is stored in one of the caches 116, the cache coherence controller 108 performs additional lookups in the coherence directory on only individual banks in the sub-grouping. If a cache status 210 indicates that the data of an individual bank is stored in one of the caches 116, the cache coherence controller 108 performs an additional lookup in the coherence directory on only the individual bank represented by the cache status 210.

Figure 5:
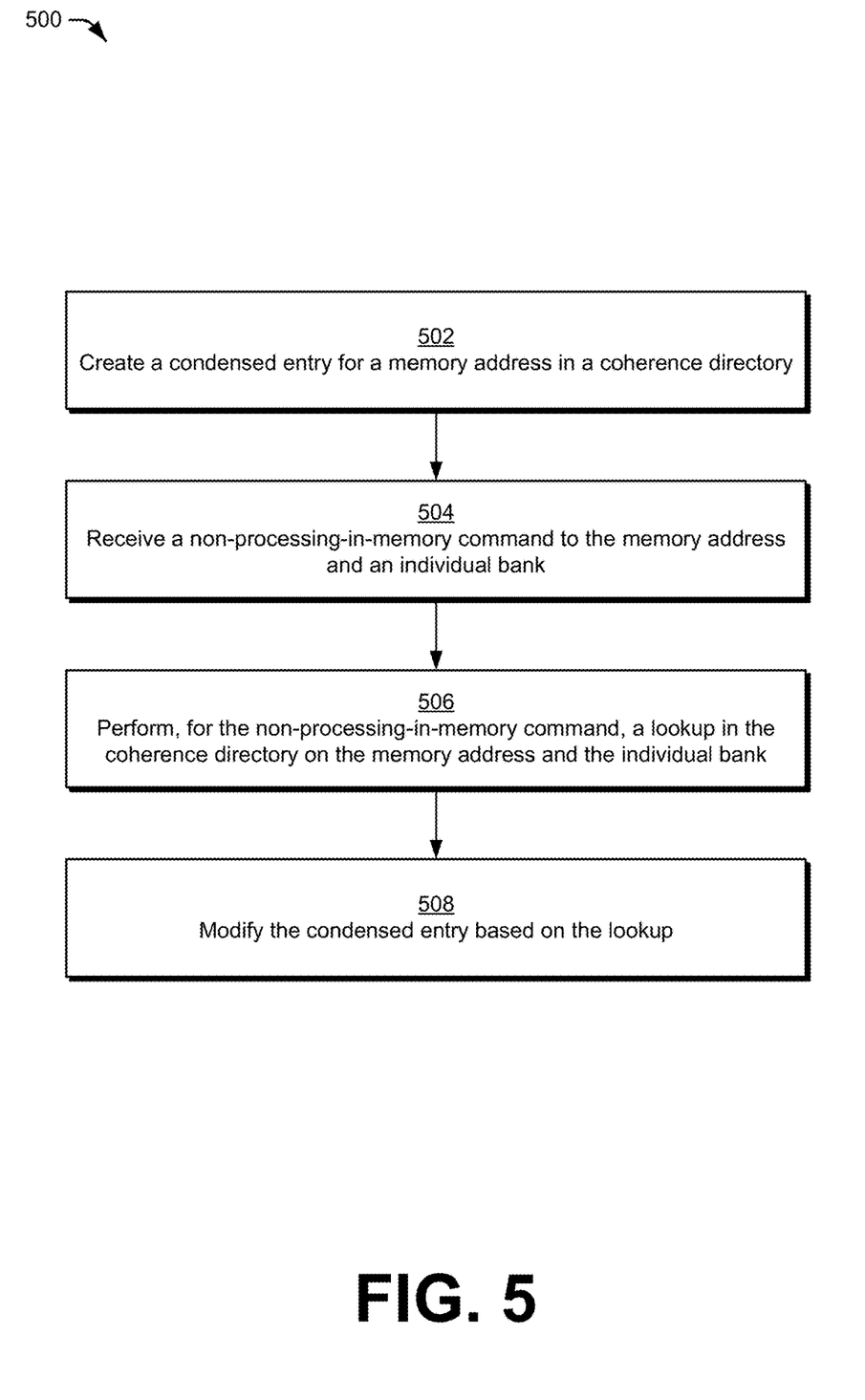
FIG. 5 depicts a procedure in an example implementation of condensed coherence directory entries for processing-in-memory.

FIG. 5 depicts a procedure 500 in an example implementation of condensed coherence directory entries for processing-in-memory. A condensed entry is created in a coherence directory for a memory address (block 502). For example, the cache coherence controller 108 creates a condensed entry 122 for the memory address 204 in the coherence directory 118 responsive to the initial lookups 206, in accordance with block 406 of procedure 400.

A non-processing-in-memory command is received to the memory address and an individual bank (block 504). By way of example, the cache coherence controller 108 receives a non-PIM command from the core 106 that includes the memory address 204 and an individual bank 120. In one or more implementations, the non-PIM command causes the data of the memory address 204 and the individual bank to be stored in the caches 116.

A lookup is performed in the coherence directory for the non-processing-in-memory command on the memory address and the individual bank (block 506). By way of example, the cache coherence controller 108 performs a coherence directory lookup for the memory address 204 and the individual bank 120. A coherence directory hit indicates that the data of the memory address 204 and the individual bank is already cached. Therefore, the cache coherence controller 108 proceeds to perform the above-described hit coherence protocol with respect to the coherence directory entry. In contrast, a coherence directory miss indicates that the data of the memory address 204 and the individual bank 120 was not previously cached, but is now being cached by the non-PIM command.

The condensed entry is modified based on the lookup (block 508). By way of example, the cache coherence controller 108 modifies the condensed entry 122 responsive to the lookup resulting in a miss in the coherence directory 118. In implementations in which the condensed entry 122 does not include the cache statuses 210, the cache coherence controller 108 invalidates the condensed entry 122. In implementations in which the condensed entry 122 includes the cache statuses 210 for the sub-groupings of banks, the cache coherence controller 108 modifies the cache status 210 of the sub-grouping that includes the individual bank 120. In implementations in which the condensed entry 122 includes the cache statuses 210 for individual banks, the cache coherence controller modifies the cache status 210 of the individual bank 120.

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein (including, where appropriate, the processing unit 102, the memory module 104, the core 106, the cache coherence controller 108, the memory controller 110, the memory 112, and the PIM component 114) are implemented in any of a variety of different manners such as hardware circuitry, software or firmware executing on a programmable processor, or any combination of two or more of hardware, software, and firmware. The methods provided are implemented in any of a variety of devices, such as a general purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A computing device comprising:
   a core that includes a cache;
   a memory that includes multiple banks;
   a coherence directory that includes a condensed entry representing data of a memory address stored in more than one of the multiple banks, the condensed entry indicating that the data represented by the condensed entry is not stored in the cache; and
   a cache coherence controller configured to:
      receive a processing-in-memory command to the memory address; and
      perform a lookup in the coherence directory for the processing-in-memory command based on inclusion of the condensed entry in the coherence directory.

2. The computing device of claim 1, wherein the cache coherence controller is configured to perform, responsive to receiving the processing-in-memory command, a single lookup in the coherence directory for the memory address and the multiple banks based on inclusion of the condensed entry in the coherence directory.

3. The computing device of claim 1, wherein the cache coherence controller is further configured to:
   receive an initial processing-in-memory command to the memory address;
   perform, for the initial processing-in-memory command, initial lookups in the coherence directory on each of the multiple banks; and
   create the condensed entry responsive to the initial lookups.

4. The computing device of claim 1, wherein a non-processing-in-memory command causes the data associated with the memory address and an individual bank of the multiple banks to be stored in the cache.

5. The computing device of claim 4, wherein the cache coherence controller is further configured to invalidate the condensed entry responsive to the non-processing-in-memory command being received.

6. The computing device of claim 1, wherein the coherence directory includes an indication of a range of memory addresses that relate to processing-in-memory workloads.

7. The computing device of claim 6, wherein the cache coherence controller is further configured to:
- receive a non-processing-in-memory command to an individual bank and a particular memory address;
- perform an additional lookup in the coherence directory for the individual bank and the particular memory address, the additional lookup missing in the coherence directory; and
- perform, based on the particular memory address being included in the range of memory addresses, a further lookup in the coherence directory for an additional condensed entry having the particular memory address.

8. The computing device of claim 7, wherein the cache coherence controller is further configured to bypass, based on the particular memory address not being included in the range of memory addresses, the further lookup.

9. A method comprising:
- receiving a first processing-in-memory command to a memory address;
- performing, for the first processing-in-memory command, lookups for the memory address in a coherence directory on multiple banks of a memory;
- creating a condensed entry in the coherence directory representing data of the memory address stored in more than one of the multiple banks responsive to the lookups, the condensed entry including multiple cache statuses each indicating whether data associated with the memory address and an individual bank of the multiple banks is stored in a cache of a core;
- receiving a second processing-in-memory command to the memory address; and
- performing a lookup in the coherence directory for the second processing-in-memory command based on each of the multiple cache statuses indicating that the data is not stored in the cache.

10. The method of claim 9, wherein performing the lookup includes performing a single lookup in the coherence directory for the second processing-in-memory command.

11. The method of claim 9, wherein a non-processing-in-memory command causes the data associated with the memory address and a respective individual bank of the multiple banks to be stored in the cache.

12. The method of claim 11, further comprising modifying a respective cache status of the condensed entry to indicate that the data of the respective individual bank is stored in the cache responsive to receiving the non-processing-in-memory command.

13. The method of claim 12, further comprising:
- receiving a third processing-in-memory command to the memory address;
- performing, for the third processing-in-memory command, an additional lookup for the condensed entry in the coherence directory, the condensed entry including the respective cache status; and
- performing a further lookup in the coherence directory for the third processing-in-memory command, the further lookup performed on the respective individual bank.

14. The method of claim 13, wherein the further lookup is a single lookup in the coherence directory.

15. An apparatus comprising:
- a multi-core processor that includes multiple caches;
- a memory that includes multiple banks;
- a coherence directory that includes a condensed entry representing data of a memory address stored in more than one of the multiple banks, the condensed entry including multiple cache statuses each indicating whether data associated with the memory address and a sub-grouping of the multiple banks is stored in one of the multiple caches; and
- a cache coherence controller configured to:
  - receive a processing-in-memory command to the memory address; and
  - perform a lookup in the coherence directory for the processing-in-memory command based on each of the multiple cache statuses indicating that the data is not stored in one of the multiple caches.

16. The apparatus of claim 15, wherein the cache coherence controller performs a single lookup in the coherence directory for the processing-in-memory command.

17. The apparatus of claim 15, wherein the cache coherence controller is further configured to:
- receive an initial processing-in-memory command to the memory address;
- perform, for the initial processing-in-memory command, initial lookups in the coherence directory on each of the multiple banks; and
- create the condensed entry responsive to the initial lookups.

18. The apparatus of claim 15, wherein a non-processing-in-memory command causes the data associated with the memory address and an individual bank of the multiple banks to be stored in at least one cache of the multiple caches.

19. The apparatus of claim 18, wherein the cache coherence controller is further configured to modify a respective cache status of the condensed entry to indicate that the data of a corresponding sub-grouping of the multiple banks is stored in one of the multiple caches responsive to the non-processing-in-memory command being received.

20. The apparatus of claim 19, wherein the cache coherence controller is further configured to:
- receive an additional processing-in-memory command to the memory address;
- perform, for the additional processing-in-memory command, an additional lookup for the condensed entry in the coherence directory, the condensed entry including the respective cache status; and
- perform, for the additional processing-in-memory command, further lookups on individual banks of the corresponding sub-grouping.

* * * * *